US008892116B2

(12) United States Patent
Doyle

(10) Patent No.: US 8,892,116 B2
(45) Date of Patent: Nov. 18, 2014

(54) METHOD AND APPARATUS FOR ENHANCED PRIVACY WHILE TRACKING MOBILE WORKERS

(75) Inventor: Thomas F. Doyle, San Diego, CA (US)

(73) Assignee: Omnitracs, LLC, San Diego, CA (US)

( * ) Notice: Subject to any disclaimer, the term of this patent is extended or adjusted under 35 U.S.C. 154(b) by 1020 days.

(21) Appl. No.: 11/345,997

(22) Filed: Feb. 1, 2006

(65) Prior Publication Data

US 2007/0178909 A1 Aug. 2, 2007

(51) Int. Cl.
*H04W 24/00* (2009.01)
*G01S 5/00* (2006.01)

(52) U.S. Cl.
CPC ................................. *G01S 5/0027* (2013.01)
USPC ..................... 455/456.1; 455/404.1; 455/421; 455/456.2; 455/456.3; 455/456.5; 455/456.6; 455/457; 370/310.2; 370/328

(58) Field of Classification Search
CPC ..... H04W 76/007; H04W 64/00; H04W 4/02; H04W 48/04; H04W 88/02; H04W 84/18; H04W 80/04; H04L 2012/5607
USPC .......... 455/404.1, 456.1, 456.2, 456.3, 456.4, 455/456.5, 456.6, 457, 421; 370/310, 370/310.2, 328
See application file for complete search history.

(56) References Cited

U.S. PATENT DOCUMENTS

| | | | |
|---|---|---|---|
| 5,909,672 A * | 6/1999 | Madore et al. | 705/32 |
| 5,913,201 A * | 6/1999 | Kocur | 705/9 |
| 6,345,281 B1 * | 2/2002 | Kardos et al. | 707/201 |
| 6,693,585 B1 | 2/2004 | MacLeod | |
| 6,802,005 B1 * | 10/2004 | Berson | 713/178 |
| 6,892,131 B2 * | 5/2005 | Coffee et al. | 701/200 |
| 7,004,389 B1 * | 2/2006 | Robinson et al. | 235/382 |
| 7,366,522 B2 * | 4/2008 | Thomas | 455/456.1 |
| 2004/0185876 A1 * | 9/2004 | Groenendaal et al. | 455/456.5 |
| 2005/0021428 A1 * | 1/2005 | Costello | 705/32 |

FOREIGN PATENT DOCUMENTS

| | | |
|---|---|---|
| GB | 2398687 A | 8/2004 |
| JP | 08065413 A | 3/1996 |
| KR | 20040051859 A | 6/2004 |

OTHER PUBLICATIONS

International Search Report—PCT/US2007/061496 from International Search Authority Jul. 17, 2007.
Written Opinion—PCT/US2007/061496 International Search Authority European Patent Office Jul. 17, 2007.

\* cited by examiner

*Primary Examiner* — Steve D Agosta

(74) *Attorney, Agent, or Firm* — Arent Fox LLP

(57) ABSTRACT

A wireless communication device transmits location information associated with a mobile worker at a first interval when the worker is assigned to a work task. When the worker is not working on the work task, the wireless communication device does not transmit location information, or transmits the location information less persistently. In this manner, business value of tracking mobile worker location is achieved while also allowing for enhanced privacy for the mobile worker when not working on a work task.

11 Claims, 5 Drawing Sheets

METHOD AND APPARATUS FOR ENHANCED PRIVACY WHILE TRACKING MOBILE WORKERS

BACKGROUND

1. Field

This disclosure relates generally to mobile communications systems, and more particularly to tracking the location of mobile workers using mobile communications devices.

2. Background

Mobile workers in recent years have increasingly become equipped with wireless communications devices. Both the mobile worker and the businesses that employ these workers increasingly rely on such devices to send and receive tasks, status information, and communications in general. Such wireless communications devices initially included pagers that a dispatch or other party could use to send various messages to the mobile worker, such as messages to call a particular number and/or text messages. The wireless communications devices evolved to provide voice connections such as with cellular telephones, and have become increasingly complex in recent years with the ability to provide voice communications and send/receive data and text messages over a wireless communications device capable of both voice and two-way data and text communications. In many instances, mobile workers receive dispatch to jobs over such devices, acknowledge the dispatch and accept/decline the jobs over such devices and periodically update the status of a job using such devices.

More recently, communications devices have incorporated position sensing components such as a global positioning system (GPS) receivers. GPS receivers rely on a signal received from various GPS satellites to determine a location of the GPS receiver to a fairly high degree of accuracy. Such position sensing components may be used to monitor the position and place or location of a mobile worker. In some instances, the wireless communications device will periodically determine the location of the worker using the position sensing components and transmit this location to a central server or central dispatch. In this manner, the dispatch may monitor the location of a particular mobile worker. Such location monitoring may be used to verify the productivity of the worker and may also be used to determine which of a number of mobile workers should receive dispatches to certain jobs.

For example, a utility service worker may carry such a wireless communication device that has position sensing capability. A dispatch may receive periodic updates from the wireless communication device indicating the position of the mobile worker. In the event that a new job comes into the dispatch which needs to be sent to a mobile worker to complete, the dispatch may send such a job to a worker in close proximity to the location of the new job. Similarly, in the trucking industry it is often desirable to monitor the progress of a shipment using such a tracking feature.

However, such location tracking has raised privacy concerns for many mobile workers. Particularly, such workers have concerns that such tracking while the worker is performing personal tasks or is not working on a specific work-related job may impinge on personal privacy.

SUMMARY

Disclosed are systems and methods for tracking the location of workers while also enhancing a worker's personal privacy. In one embodiment, a method is provided for tracking the location of a mobile worker comprising: (a) providing the worker with a wireless communication device having a location detection component; (b) determining that the worker is assigned to be working on a work task; (c) tracking, at a first periodic interval, the location of the wireless device when the worker is assigned to be working on a work task; (d) determining that the worker is not assigned to be working on a work task; and (e) discontinuing the tracking of the location of the wireless communication device at the first periodic interval when the worker is not assigned to be working on a work task. In one embodiment, the location of the wireless communication device is tracked at a second periodic interval when it is determined that the worker is not assigned to be working on a work task, the first periodic interval having a higher frequency than the second periodic interval. Also, when it is determined that the worker is not assigned to be working on a work task, the location of the worker may not be tracked at all. The method in another embodiment further comprises generating a notification when the location of the worker is outside of an expected location of the worker when the worker is assigned to be working on a work task.

The method in yet another embodiment determines that the worker is assigned to be working on a work task and a task has been assigned to the mobile worker, an acknowledgement of the task has been received from the mobile worker, and the worker and associated wireless communication device have been marked as working on a work task. The worker is determined to not be working on a work task, in an embodiment, when an indication is received from the wireless communication device that the worker is no longer on the work task, and the worker and associated wireless communication device are marked as not working on a work task. In still another embodiment, the step of determining that a worker is assigned to be working on a work task comprises: (a) determining the current time; (b) comparing the current time with a business schedule associated with the mobile worker; and (c) marking the worker and associated wireless communication device as working on a work task when the current time is within the business hour schedule. The step of tracking, in an embodiment, comprises: (a) determining a current location of the wireless communication device; (b) sending the current position from the wireless communication device; and (c) repeating the determining and sending steps at the first periodic interval. The step of tracking may also comprise: (a) sending a location request to the wireless communication device; (b) receiving a reply from the wireless communication device containing a current location information; and (c) repeating the sending and receiving steps at the first periodic interval.

In another embodiment, a wireless communication device is provided comprising: (a) a wireless transmitter/receiver component operable to send/receive signals from a wireless base station, the received signals modulated to include task information related to at least one work task, the wireless transmitter/receiver further being operable to demodulate the received signal and output the task information; (b) a GPS receiver operable to determine a location of the wireless communication device and output location information; and (c) a control processor coupled to the wireless transmitter/receiver and the GPS receiver and operable to receive the task information and the location information, and further operable to periodically provide the location information to the transmitter/receiver to be modulated and transmitted to the wireless base station when the task information indicates an assignment to a work task. The control processor may also be operable to receive input from a user interface associated with the wireless communication device, wherein the location information from the GPS receiver is transmitted when a user indicates on the user interface that the task is accepted. The control processor may also be operable to discontinue transmitting the location information when an input is received from the user interface indicating that the user is off task. The task information, in an embodiment, includes a location tracking interval and the control processor is operable to transmit the location information of the wireless communication device periodically according to the location tracking interval.

DETAILED DESCRIPTION

A need and desire has been recognized to provide mobile workers with privacy in certain instances while the workers are carrying a wireless communications device capable of tracking the worker's location. For example, a worker may carry the wireless communication device when the worker is not working on a task, or not "on company time." While such workers often recognize the value and the interest that a company may have in tracking their location while on the job, they raise these concerns about location tracking while not they are not on the job. It is further recognized that a company is generally not interested in tracking the location of a worker that is not on the job in most instances, and that in certain instances, such as if a worker is on call, the company may want to know the location of the worker at all times. Systems, methods, and apparatuses to meet the needs of both the mobile worker and the company are provided by disabling the tracking feature, or tracking with less persistence, when a mobile worker is not working on a company related task.

Figure 1:
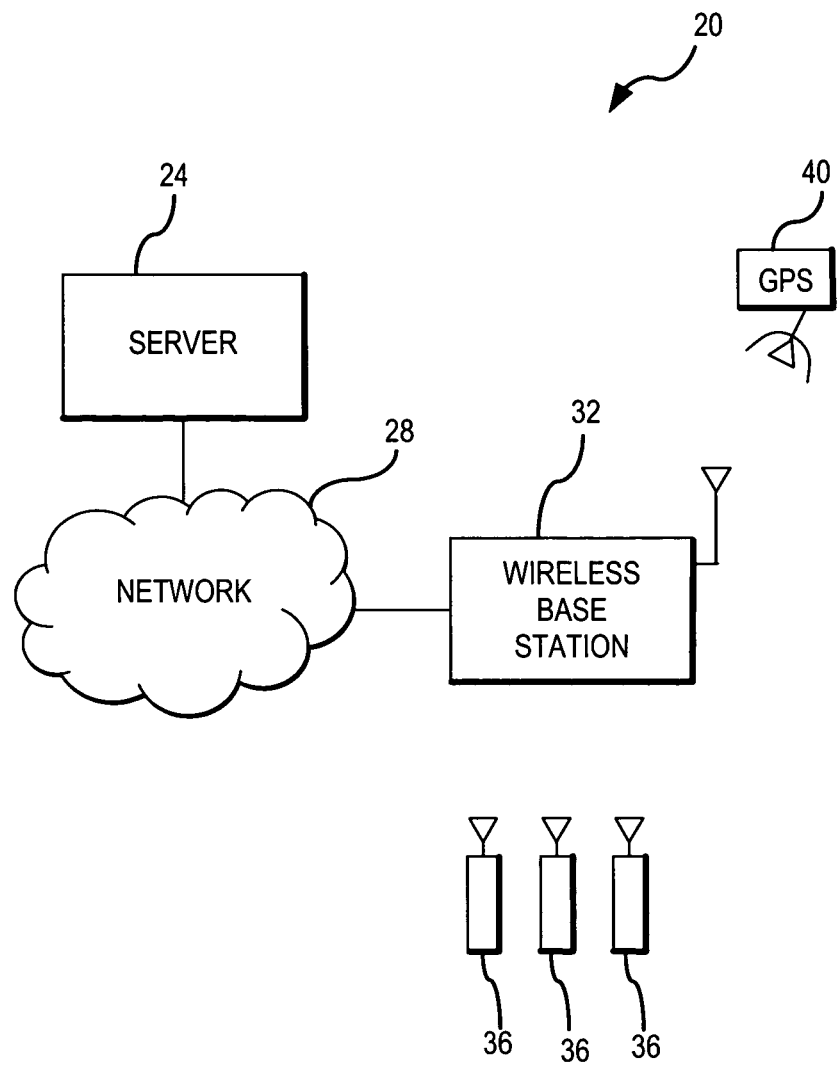
FIG. 1 is a block diagram illustration of a wireless communication network.

FIG. 1 is a block diagram of an exemplary mobile communications network 20. The mobile communications network includes a server 24 which is interconnected to a network 28. The server 24 may reside in a dispatch center for a company, or may be connected to a dispatch center via another network (not shown) such at the Internet. The server 24 in embodiments hereof receives communications from and sends communications, including various commands, to wireless communication devices 36. As is common in the art, such wireless communications devices 36 may include mobile handsets capable of sending and receiving voice calls and text/data messages. Such communication devices 36 may also include units that are built into a vehicle that the mobile worker uses. The network 28 may be a public switched telephone network (PSTN), or any other network or combination of networks that are known in the art, that connect the server 24 to a number of wireless base stations 32. A single wireless base station is illustrated in FIG. 1 for purposes of discussion and explanation, with the understanding that a wireless communication network typically contains numerous such stations. The wireless base stations 32 operate to provide wireless communications between the network 28 and mobile communication devices 36. The wireless base stations 32 and wireless communication devices 36 may communicate using any applicable wireless communication scheme over a voice channel and/or control channel. Communication may use any available analog and/or digital technology, including the various different types of digital communications, as well as combinations thereof. The wireless communication devices 36 also include position sensing receivers that are capable of providing the location of the wireless communication device. In this embodiment, the position sensing receivers include GPS receivers that receive signals from various GPS satellites 40. As is understood in the art, a GPS receiver operates to provide location information to a relatively high degree of accuracy by performing well known trilateration algorithms based on signals from several GPS satellites 40. While GPS is illustrated in this embodiment, it will be understood that any type of position sensing may be used, such as, for example, other satellite based position sensing, base station based position sensing such as AFLT, hybrid systems that use satellite and/or base station based position sensing, and RF profile recording systems, to name but a few.

In one specific embodiment, the server 24 is located in a control and dispatch center of a service industry having mobile workers that perform services at various customer sites, each of the mobile workers having one or more communication devices 36. A dispatcher located at the dispatch center enters a command to dispatch a job to server 24. For example, a dispatcher may take a service call from a customer, and provide with the dispatch command the customer address along with the type of problem to be corrected or addressed by a mobile worker to the server 24. This dispatch is sent as a data message to the wireless communication device 36, that is operating an application that operates to receive such communications. The server 24 may be connected by any appropriate connection to the network 28. The network 28, as mentioned above, may include a public switched telephone network (PSTN), that is in turn connected to the wireless base station 32. The server 24 may have a modem which connects to the network 28 to establish a connection to a particular wireless communication device 26 through the wireless base station 32. Each of the communication devices 36, as is understood, has a unique identification such as a unique phone number or other identification. The server 24 may establish any type of communication with the wireless communication device 36 to indicate that the job is waiting. In one embodiment, the server 24 pushes the job and relevant information to a desired wireless communication device 36 using a control channel associated with the wireless communication network. In this embodiment, the wireless communication device 36 includes an application that receives the job and relevant information and provides an indication to a mobile worker that such a job is waiting. The mobile worker may access the application through a user interface on the wireless communication device 36 and review the dispatch. The worker, in some embodiments, may then either accept the job or reject the job, with an acknowledgment sent back to the server through the wireless base station 32 and network 28. In one embodiment, when the mobile worker acknowledges the dispatch, the wireless communication device 36 transmits location information provided from the position receiver to the server 24 at predetermined intervals. Such communications will be described in further detail below. Alternatively, in some embodiments, the mobile communication device 36 receives jobs and transmits location information only during business hours. Such an embodiment in further detail below.

Figure 2:
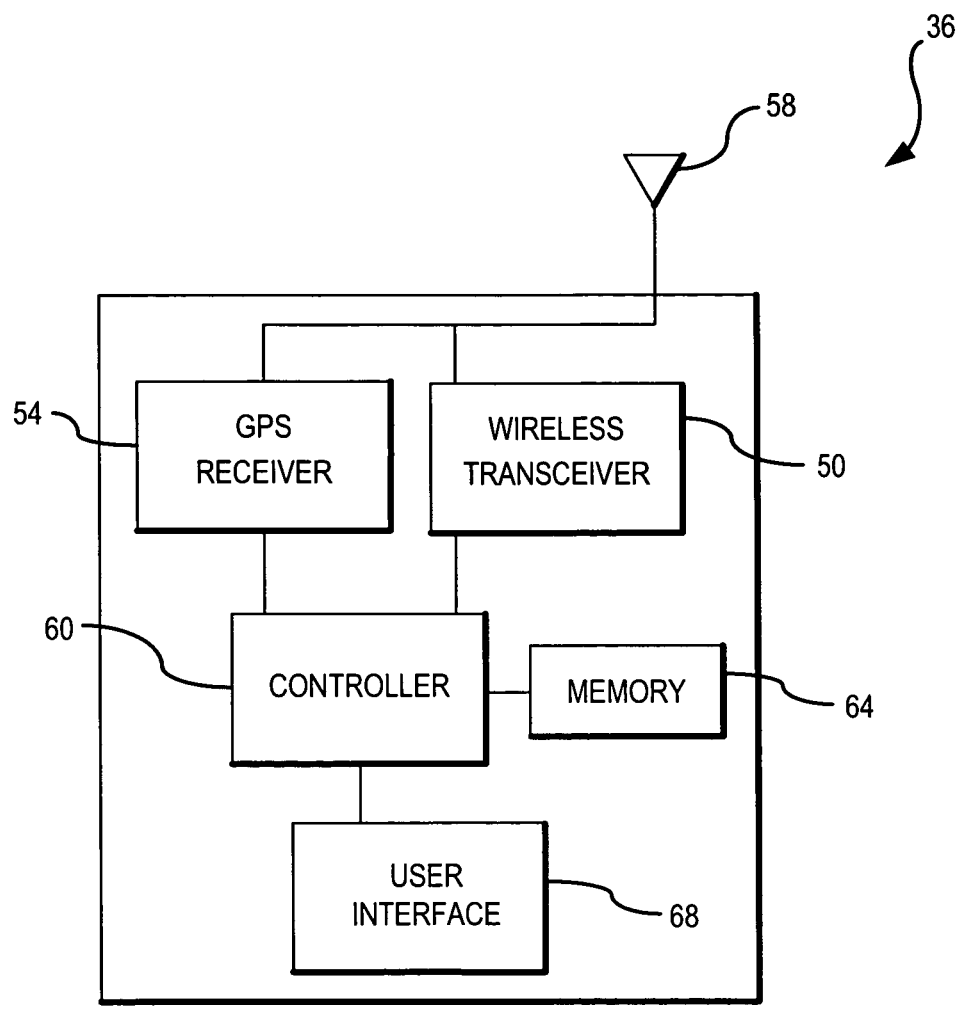
FIG. 2 is a block diagram illustration of a wireless communication device of an embodiment described herein.

Referring now to FIG. 2, an embodiment of a wireless communications device 36 is described. In this embodiment, the wireless communications device 36 includes circuitry and components that are typical of many such devices. The device includes a wireless transceiver 50, a GPS receiver 54 and an antenna 58. The wireless transceiver 50 is operable to receive wireless signals that are received at antenna 58 and demodulate the signals and provide them to a controller 60. The wireless transceiver 50 may also receive signals from the controller, modulate the signals onto an RF signal and transmit the modulated signal over the antenna 58. The GPS receiver 54 is operable to receive a GPS signal from an appropriate number of GPS satellites to determine location information. The GPS receiver 54 is also connected to antenna 58. Antenna 58, while illustrated as a single antenna, may include one or more separate antennas, such as a separate antenna for the GPS receiver, a send antenna, and/or a receive antenna. The controller 60 is coupled to a memory 64 and a user interface 68. The controller 60 controls operations of the wireless communication device 36 including operating any applications that are running on the wireless communication device 36. The memory 64 may include any type of memory suitable for such a wireless communication device including volatile and/or non-volatile memory. The memory 64 includes code to run the different applications for the wireless communication device 36. The user interface 68 may be any appropriate user interface including a visual and/or graphical user interface and associated keypad and/or any other physical input device.

Figure 3:
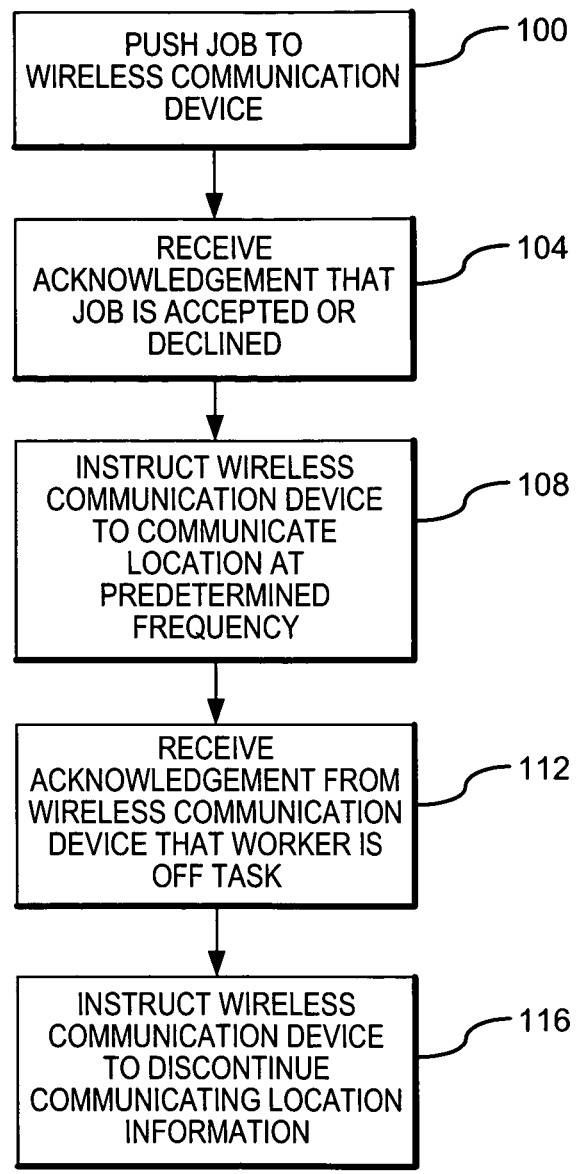
FIG. 3 is a flow chart diagram illustrating the operations of a server of one embodiment.

Referring now to FIG. 3, a flow chart diagram of an embodiment of the operations performed by a server 24 is described. In this embodiment, the server pushes one or more jobs to a wireless communication device, as indicated at block 100. The server receives an acknowledgement that the job is accepted or declined at block 104. The job may be entered into a software application running on the server by a dispatcher that is located locally and/or remotely from the server. For example, a dispatcher may be a worker in a call center for a service company. When the call center employee receives the service request from a customer, the call center employee may enter such a service request into a software application that then pushes this job to the mobile communication device. The mobile worker, for any number of reasons, may either accept or decline the job. For example, if the mobile worker is currently working on a job and knows that the job will not be completed in time to begin the next service call, the mobile worker may decline the job. Alternatively, if the mobile worker is aware that the new job may be started at the appropriate site within a certain time limit, such as a service goal time limit established by the service company, the mobile worker may accept the job. In either case, the mobile communication device, upon receiving an acknowledgement from the mobile worker, forwards the acknowledgement to the server. When selecting the mobile worker and associated mobile communication device to push a job to, the server may select a mobile worker that is within the closest proximity to the location of the new job. As mentioned above, the wireless communication devices 36 include position sensors and periodically report the position of the communication device, and thus the position of the particular mobile worker, to the server. When a new job is received at the server, the job may be dispatched to the worker that is closest in proximity to the new job. However, as mentioned above, the mobile worker that is in closest proximity may not be able to start and/or complete the new job within an appropriate time. In such a case, the mobile worker may decline the job and upon receiving this indication, the server may dispatch the job to a different mobile worker, or the original mobile worker may be contacted and assigned to re-prioritize tasks. Of course, the protocols and business rules to select the mobile worker to which the task is pushed can be based on any number of criteria. When the server receives acknowledgement that the job is accepted, the server, at block 108, instructs the wireless communication device to communicate the location of the wireless communication device at a predetermined frequency. The server, in an embodiment, marks the worker as under dispatch, or on task, and monitors the location of the communication device. Alternatively, instead of generating the instruction to communicate location at the server, the wireless device may automatically provide location information when the wireless device accepts a job.

It is assumed that the location of the worker is the same as, or nearly the same as, the location of the wireless communication device. Accordingly, as used herein, it will be understood that the location of the wireless communication device and the location of the worker both refer to location information communicated from the wireless communication device based on the location sensor of the communication device. The server, in some embodiments, also compares the location of the worker with an expected location of the worker, and generates a notification when the location of the worker deviates substantially from the expected location. The predetermined frequency at which location is tracked may be selected based on the particular needs of the business or enterprise that employs the mobile worker. It is noted that, when using the term predetermined frequency or predetermined interval herein, it will be understood that such communications may not occur precisely at a fixed frequency or interval, and that such times are approximate. For example, a mobile communications device may be outside of a wireless communications coverage area and thus unable to communicate location information. Further, in some instances location sensor within the device may not have enough data to determine a location, such as when a GPS receiver is not receiving signals from enough GPS satellites. In such situations, the wireless communication device communicates location information when it is next able to do so. In such a manner, the location of a particular mobile worker may be monitored. As will be readily apparent, monitoring the location of a mobile worker may be a valuable tool for many companies, such as service companies and trucking companies, to name but two. For example, and as mentioned above, a utility service company may dispatch jobs to a service worker that is closest in proximity to a new job. In such a manner, the service company may efficiently utilize its resources in order to enhance customer service and/or increase customer satisfaction. Furthermore, the location of a mobile worker may be useful to a company as a means of supervision. As will be understood, it is not efficient to directly supervise mobile workers when they are in the field. As such, mobile workers may take unauthorized trips and/or fail to proceed directly to another task when they are supposed to. Thus, monitoring the location of a worker may aid the company in ensuring that the workforce is operating in a desired fashion.

As will be further apparent, the mobile workers dislike being persistently tracked. Many mobile workers feel this is an impingement on their privacy rights, and would prefer not to have their position tracked at all. While many such workers recognize a legitimate business need for such tracking, they prefer not to be tracked while running personal errands on personal time for example. In the embodiment of FIG. 3, the mobile worker may provide an indication that the mobile worker is not working on a specified task, and thus should not be tracked. In this embodiment, as indicated at block 112, the server receives this acknowledgement from the wireless communication device that a worker is off task, or no longer under dispatch. Next, at block 116, the server instructs the wireless communication device to discontinue communication of location information. Alternatively, the wireless communication device may communicate location information at less frequent intervals. Again, instead of originating the instruction to discontinue communication of location information at the server, the wireless communication device may automatically cease communication of location information when the off task information is sent. For example, while a worker is on a task, the wireless communication device may communicate location information twice per hour, that is every 30 minutes, to the server for location tracking purposes. In the event that a worker indicates that the worker is off task, the wireless communication device may communicate location information only once per hour. As will be understood, the frequencies at which location information is communicated may be selectable to meet the particular needs of the customer and/or company. For example, when a worker is off task, it may be indicate that the worker is on a scheduled break. The company may provide for employees to have breaks, for example, no more than one hour. In such a case, having the wireless communications device transmit location information once every hour will enable the company to determine the location of an employee following the expiration of the break time. Alternatively, a mobile worker may carry the mobile communication device on their person even during non-work hours, such as after work and nights and weekends. In such a case, the communication of location information may be completely discontinued until the mobile worker indicates that they are again working. Such an embodiment allows for enhanced privacy of the mobile worker while providing the company with desired location information for the employee while the employee is working.

Furthermore, the indications that a worker is working and not working may be tied into a timekeeping application that is incorporated into the company's payroll system, thus paying the mobile worker for hours actually working and not paying for hours when the employee is not on task. Thus, the timekeeping function may be enhanced and operate more efficiently in such an embodiment. Further efficiencies may also be gained in many embodiments. For example, reducing the amount of tracking of the mobile communications device may result in more efficient use of a company's airtime for wireless communication devices. As is understood, wireless communication networks generally have a specified allotment of airtime that any particular wireless communication device or associated group of devices may use. Often, companies purchase relatively large blocks of such air time that are used by numerous different mobile communication devices. However, in a relatively large enterprise, even the periodic transmission of location information, while not consuming significant air time for any particular wireless communication device, can consume significant amounts in the aggregate of all of the communication devices for the enterprise. Thus, reducing or eliminating such transmissions when a worker is off task may also allow the company to better utilize its airtime and/or enter into a more favorable agreement with a wireless communication provider.

Figure 4:
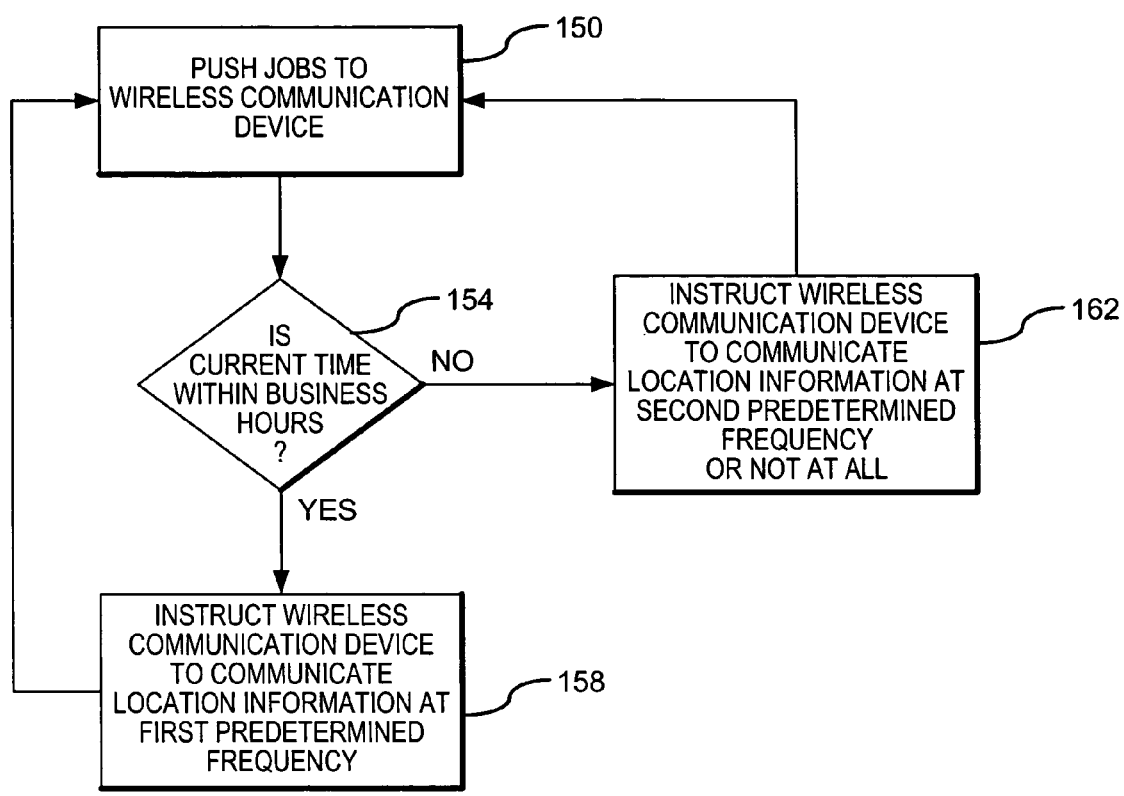
FIG. 4 is a flow chart diagram illustrating the operations of a server of another embodiment.

Referring now to FIG. 4, a flow chart diagram for the operations of a server when operating to not receive location information during non-business hours is now described. In this embodiment, as indicated at block 150, the server pushes jobs to a wireless communication device. The determination of when to push jobs to a particular wireless communication device is done in a similar manner as described above. At block 154, it is determined whether the current time is within business hours. If the current time is within business hours, the server instructs the wireless communication device to communicate location information at a first predetermined frequency, as indicated at block 158. The operations beginning at job block 150 are then repeated. If it is determined at block 154 that the current time is not within business hours, the server instructs the wireless communication device to communication location information at a second predetermined frequency or not at all, as indicted at block 162. The operations at block 150 are then repeated. Such an embodiment may be useful for certain enterprises that have mobile workers that perform tasks as they come up during business hours. Such an enterprise may include, for example, a delivery type industry where items for delivery are pushed to a mobile worker that drives a particular delivery vehicle. Such a mobile worker may deliver items on a specified route or in a specified area during a working day. As items come up that are to be delivered within that specified route or delivery area, the items are pushed to the mobile worker's wireless communication device. Periodically, such as once per day, the mobile worker may have items loaded for delivery into the delivery vehicle, and take the items out for delivery. In such a case, whenever an order comes in that is to be delivered in the mobile worker's delivery area, the item is pushed to the mobile worker's wireless communication device. The software on the server or an application running on the mobile communication device may determine an optimal route for the mobile worker to take when delivering the items to the specified customers. Furthermore, in such an embodiment, the mobile worker is responsible for delivering all deliveries within the particular route or area, and the option to accept and/or decline a job is not required, and jobs are pushed to the wireless communication device regardless of whether the mobile worker is working or not. In such a case, the server may simply instruct the wireless communication device not to communicate location information when the mobile worker is not working.

Figure 5:
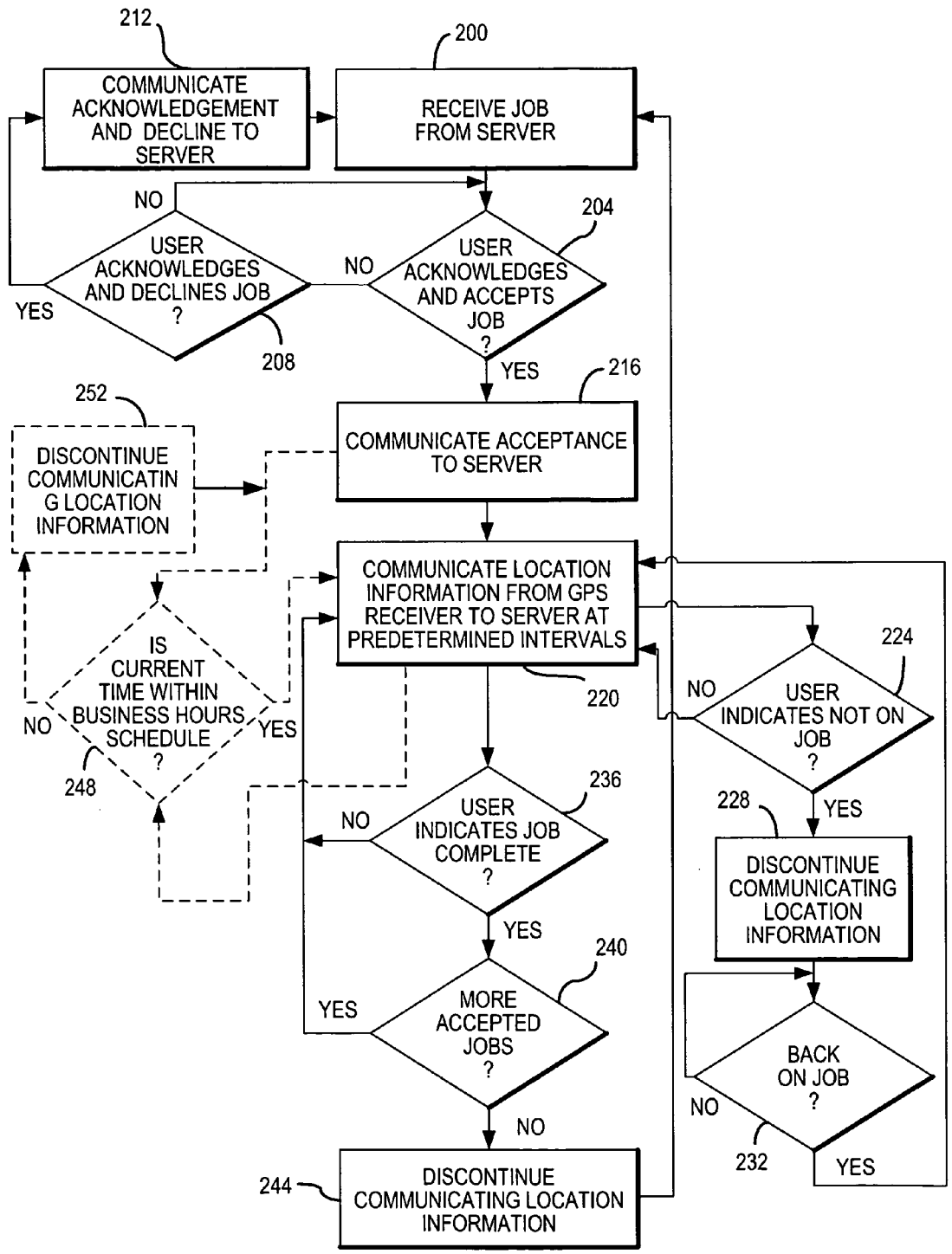
FIG. 5 is a flow chart diagram illustrating the operations of a wireless communication device of one embodiment.

Referring now to FIG. 5, a flow chart diagram illustrating an operational step embodiment of a wireless communication device is now described. In this embodiment, the wireless communication device receives a job from the server, as indicated at block 200. The wireless communications device receives the job and adds it to a job queue that is provided to the mobile worker. The wireless communication device may also give an indication to the mobile worker that a new job is present. Such an indication may be, for example, an audio or visual alarm, or a silent alarm such as a vibration. At block 204, it is determined if the user has acknowledged and accepted the job. If the user has not acknowledged and accepted the job, the wireless communications device determines if the user has acknowledged and declined the job, according to block 208. If the user has not acknowledged and accepted or rejected the job, the device continues to wait for such an acknowledgement as described with respect to blocks 204-208. If the user has acknowledged and declined the job, the wireless communication device communicates this to the server, as indicated at block 212. If the user has acknowledged and accepted the job at block 204, the wireless communication device communicates such an acceptance to the server as indicated at block 216. In one embodiment, the wireless communications device runs an application that performs the operations of FIG. 5. Such an application provides a graphical interface that a user may read to determine details of a job, and to view all of the jobs that may be queued to the particular user. The user, when viewing a job, may select an option to accept or decline the job by using a physical input device, such as a keypad, track wheel, or touch screen associated with the communication device.

Referring still to FIG. 5, the wireless communication device determines its present location using the GPS receiver and communicates the present location to the server at a predetermined frequency, as noted at block 220. In this embodiment, the wireless communication device and the associated application running on the wireless communication device is preprogrammed to automatically provide location information to the server at a specified frequency when the mobile worker acknowledges and accepts a job. Alternatively, similarly as described above, the server may instruct the wireless communication device to communicate location information at a specified frequency. The application running on the wireless communications device, in this embodiment, provides two options to a mobile worker after the worker has accepted the job, a first option being that the worker is not working on the job, and a second that the job is complete. Similarly as described above, the selection of these options may be entered by a user at the user interface. At block 224, it is determined if the user has indicated that he/she is not working on the job. The user may make such a selection, for example, if they are on a break or are attending to non-work related matters such a health care appointment or family matters. If it is determined at block 224 that the user has indicated they are not on a job, the communication device discontinues communicating location information, as noted at block 228. At block 232 it is determined of the user has indicated that they are back on the job. Once the user indicated they are back on the job, the operations beginning at block 220 are repeated. At block 236, it is determined if the user has indicated that the job is complete. If the job is not complete, the operations beginning at block 220 are repeated. If it is determined at block 236 that the job is complete, the wireless communication device determines if more accepted jobs are present in a job queue, as indicated at block 240. If additional jobs are present, the operations beginning at block 220 are repeated. If additional jobs are not present at block 240, the communication of location information is discontinued, as noted at block 244, and then the operations beginning at block 200 are repeated. It is noted that, when describing the communication of location information as discontinued, the communication of location information may either be completely discontinued, or the location information may be communicated at a less persistent level.

With continued reference to FIG. 5, another embodiment provides a business hours schedule and tracks location based on such a schedule. In this embodiment, with operational steps illustrated in dashed lines, the application running on the wireless communications device determines if the current time is within a business hours schedule, as indicated at block 248. If the current time is within business hours, the operations described at block 220 are continued. If the current time is not within business hours, communication of location information is discontinued, or decreased, until the current time is back within business hours as indicated at block 252. In one embodiment, the wireless communication device includes a business hour schedule in an associated memory. This business hours schedule may be entered by the user, or may be provided to the wireless communication device by the server. Such a business hours schedule may include scheduled breaks, and/or schedules starting and ending times for the work days. Alternatively, the server may have such a schedule, and communicate commands to the wireless communication device to communicate location information when the current time is within business hours, and to discontinue (or decrease) such communications when the current time is not within business hours.

The invention claimed is:

1. A method for tracking the location of a mobile worker, comprising:
   determining that a worker with a wireless communication device having a location detecting component is assigned to be working on a work task by determining whether an acknowledgement of the work task has been received from the worker, wherein said determining that the worker is assigned to be working on the work task comprises:
   assigning the work task to the worker;
   receiving the acknowledgement of the work task from the worker; and
   marking the worker and the wireless communication device as working on the work task;
   receiving the location of the wireless communication device when the worker is assigned to be working on the work task at a first frequency;
   receiving an indication from the worker via the wireless communication device that the worker is not working on the work task;
   receiving a location of the wireless communication device at a second frequency that is longer than the first frequency in response to receiving the indication that the worker is not working on the work task;
   receiving the location of the wireless communication device at a third frequency that is longer than the first frequency when the worker indicates that the worker is on the work task but is not actively working on the task;
   generating a notification when the location of the wireless communication device is outside of an expected location of the wireless communication device when the worker is assigned to be working on the work task; and
   discontinuing receiving the location of the wireless communication device upon completion of the work task.

2. The method for tracking the location of a mobile worker, as claimed in claim 1, further comprising:
   discontinuing a tracking of the location of the wireless communication device in response to receiving the indication.

3. The method for tracking the location of a mobile worker, as claimed in claim 1, wherein the receiving the indication from the worker via the wireless communication device further comprises:
   marking the worker and the wireless communication device as not working on the work task.

4. The method for tracking the location of a mobile worker, as claimed in claim 1, wherein receiving the location of the wireless communication device comprises:
   sending a location request to the wireless communication device;
   receiving a reply from the wireless communication device containing current location information; and
   repeating the receiving.

5. The method of claim 1, wherein when the worker indicates that the worker is on the work task but is not actively working on the task further comprises:
   receiving an acknowledgement from the wireless device that the worker is off task.

6. The method of claim 5, wherein off task comprises a scheduled break.

7. A non-transitory tangible computer readable medium encoded with a computer program for causing a programmable device to perform:

determining that a worker is assigned to be working on a work task by determining whether an acknowledgement of the work task has been received from the worker, wherein said determining that the worker is assigned to be working on the work task comprises:
  assigning the work task to the worker;
  receiving the acknowledgement of the work task from the worker; and
  marking the worker and the wireless communication device as working on the work task;
receiving location information related to the worker when the worker is assigned to be working on the work task at a first frequency;
receiving an indication from the worker that the worker is not working on the work task;
receiving the location information at a second frequency that is longer than the first frequency in response to receiving the indication;
receiving the location information at a third frequency that is longer than the first frequency when the worker indicates that the worker is on the work task but is not actively working on the task;
generating a notification when the location of the wireless communication device is outside of an expected location of the wireless communication device when the worker is assigned to be working on the work task; and
discontinuing receiving the location information upon completion of the work task.

8. The computer readable medium of claim 7, wherein the determining comprises:
determining that the work task is assigned to the worker.

9. The computer readable medium of claim 7, wherein the indication indicates that the worker has completed the work task.

10. At least one processor configured to track the location of a mobile worker, comprising:
a first module for determining that a worker with a wireless communication device having a location detection component is assigned to be working on a work task by determining whether an acknowledgement of the work task has been received from the worker, wherein said determining that the worker is assigned to be working on a work task comprises:
  assigning the work task to the worker;
  receiving the acknowledgement of the work task from the worker; and
  marking the worker and the wireless communication device as working on the work task;
a second module for receiving a location of the wireless communication device when the worker is assigned to be working on the work task at a first frequency;
a third module for receiving an indication from the worker via the wireless communication device that the worker is not working on the work task;
a fourth module for receiving the location of the wireless communication device at a second frequency that is longer than the first frequency in response to receiving the indication that the worker is not working on the work task;
a fifth module for receiving the location of the wireless communication device at a third frequency that is longer than the first frequency when the worker indicates that the worker is on the work task but is not actively working on the task;
a sixth module for generating a notification when the location of the wireless communication device is outside of an expected location of the wireless communication device when the worker is assigned to be working on the work task; and
a seventh module for discontinuing receiving the location of the wireless communication device upon completion of the work task.

11. An apparatus, comprising:
means for determining that a worker with a wireless communication device having a location detection component is assigned to be working on a work task by determining whether an acknowledgement of the work task has been received from the worker, wherein said determining that the worker is assigned to be working on a work task comprises:
  assigning the work task to the worker;
  receiving the acknowledgement of the work task from the worker; and
  marking the worker and the wireless communication device as working on the work task;
means for receiving a location of the wireless communication device when the worker is assigned to be working on the work task at a first frequency;
means for receiving an indication from the worker via the wireless communication device that the worker is not working on the work task;
means for receiving the location of the wireless communication device at a second frequency that is longer than the first frequency in response to receiving the indication that the working is not working on the work task;
means for receiving the location of the wireless communication device at a third frequency that is longer than the first frequency when the worker indicates that the worker is on the work task but is not actively working on the task;
means for generating a notification when the location of the wireless communication device is outside of an expected location of the wireless communication device when the worker is assigned to be working on the work task; and
means for discontinuing receiving the location of the wireless communication device upon completion of the work task.

* * * * *